United States Patent
Kubo et al.

(10) Patent No.: US 8,104,067 B2
(45) Date of Patent: *Jan. 24, 2012

(54) APPARATUS FOR RECEIVING AND PLAYING BACK DATA

(75) Inventors: Hiroaki Kubo, Shiga-ken (JP); Masahiro Murakami, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,310

(22) Filed: Apr. 17, 2010

(65) Prior Publication Data

US 2010/0257575 A1 Oct. 7, 2010

Related U.S. Application Data

(63) Continuation of application No. 09/948,285, filed on Sep. 7, 2001, now Pat. No. 7,703,122.

(30) Foreign Application Priority Data

Sep. 8, 2000 (JP) .................................. 2000-273592

(51) Int. Cl.
*H04N 7/16* (2011.01)

(52) U.S. Cl. ........................................ 725/143; 725/146
(58) Field of Classification Search ...................... 725/91
See application file for complete search history.

(56) References Cited

U.S. PATENT DOCUMENTS

| | | | | |
|---|---|---|---|---|
| 5,386,212 A | * | 1/1995 | Shen et al. | 341/67 |
| 5,613,190 A | * | 3/1997 | Hylton | 725/81 |
| 5,892,535 A | * | 4/1999 | Allen et al. | 725/36 |
| 6,598,228 B2 | * | 7/2003 | Hejna, Jr. | 725/91 |
| 7,096,481 B1 | * | 8/2006 | Forecast et al. | 725/32 |

* cited by examiner

*Primary Examiner* — Justin Shepard
(74) *Attorney, Agent, or Firm* — Michael J. Buchenhorner; Vazken Alexanian (57) ABSTRACT

An apparatus to reduce effects on playback of moving picture data caused by variations in data transmission rate that occur on a communication line, a receiving and playing back apparatus includes a receiver for receiving moving picture data transmitted over a communication line; playback modules for playing back the received moving picture data; a second buffer for temporarily storing the moving picture data received by the receiver and outputting the stored moving picture data at a desired speed; and a first buffer for providing the playback modules with moving picture data required for playback processing.

20 Claims, 7 Drawing Sheets

--Prior Art--

US 8,104,067 B2

APPARATUS FOR RECEIVING AND PLAYING BACK DATA

CROSS-REFERENCE TO RELATED APPLICATIONS

This application is a continuation of, and claims priority from, commonly-owned and co-pending U.S. application Ser. No. 09/948,285, filed on Sep. 7, 2001, which is incorporated in its entirety as if fully set forth herein. U.S. application Ser. No. 09/948,285, the parent application, claims foreign priority from 2000-273592, filed in Japan on Sep. 8, 2000.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The present invention relates to an apparatus for receiving and playing back moving picture data transmitted from a server through a communication line and a method thereof.

BACKGROUND OF THE INVENTION

Figure 6A:
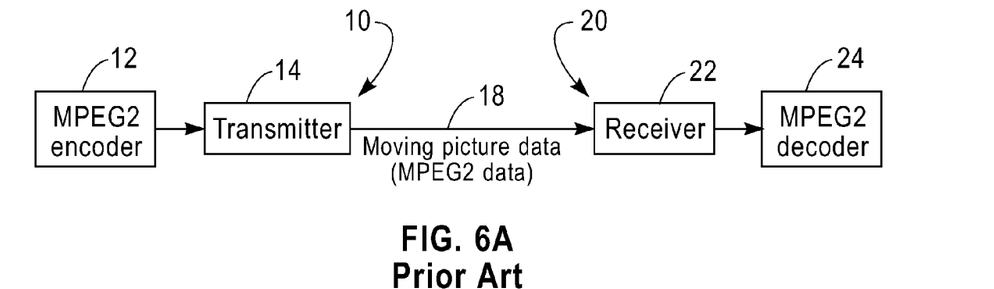
FIG. 6(a) is a block diagram showing an outline of a conventional moving picture transmission system.

FIG. 6(a) shows an outline of a moving picture distribution system. Moving picture data to be distributed includes either one of video and audio or both, and may include a static image in a moving picture. A transmission side 10 comprises an MPEG2 (Moving Picture Expert Group 2) encoder 12 for compressing moving picture data by using an MPEG2 system; and a transmitter 14 for transmitting the compressed MPEG2 data. A reception side 20 comprises a receiver 22 for receiving MPEG2 data; and an MPEG2 decoder 24 for restoring the received MPEG2 data to the state before compression. The transmission side 10 and the reception side 20 are connected to each other over a communication line 18.

Communication lines using ATM (Asynchronous Transfer Mode), Ethernet, Token Ring, ADSL (Asymmetric Digital Subscriber Line), and communication satellite, or the like are typically used as the communication line 18. Although it depends on the protocol used in each communication line, most of the communication lines have a major purpose of correctly transmitting data, so that they do not aim to transmit fixed data volume within a fixed period of time. Few communication lines always have a uniform data transmission speed.

In these communication lines, a uniform transmission rate is not always secured or constant transmission delay is not always caused, but the data transmission rate varies with time in most cases. When video and audio are transmitted over such communication lines, their data transmission rates often vary in a short time unit, even if data is transmitted at a constant rate in a long time unit.

When a data receiving speed of the receiver 22 is faster than a data playback or reproduction speed of an MPEG2 decoder 24, data is overflown on the decoder 24 side, which causes lack of data. When the data receiving speed of the receiver 22 is slower than the data playback speed of the MPEG2 decoder 24, a shortage of data occurs on the decoder 24 side, which results in an inability to play back the data. In this case, due to noise specific to digital playback that may occur on a display screen or stop of motion of displayed picture, the video becomes extremely unclear. It is substantially similar to being impossible to play back the moving pictures. Measures are generally taken on the transmission side 10 to minimize variations in data transmission when transmitting data. It is, however, impossible to take measures against the variations caused by routers and the like on the communication line 18 because it is difficult for the transmission side 10 to detect the variations. Data volume received by the reception side 20 from the transmission side 10 varies by time in most cases.

Figure 7A:
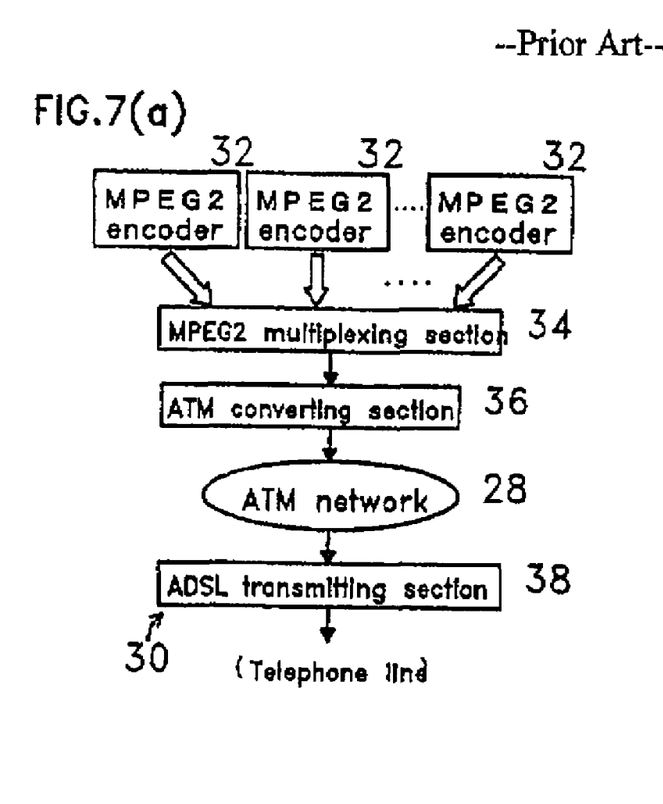
FIG. 7(a) is a block diagram showing a structure example of a conventional transmitting server.
Figure 7B:
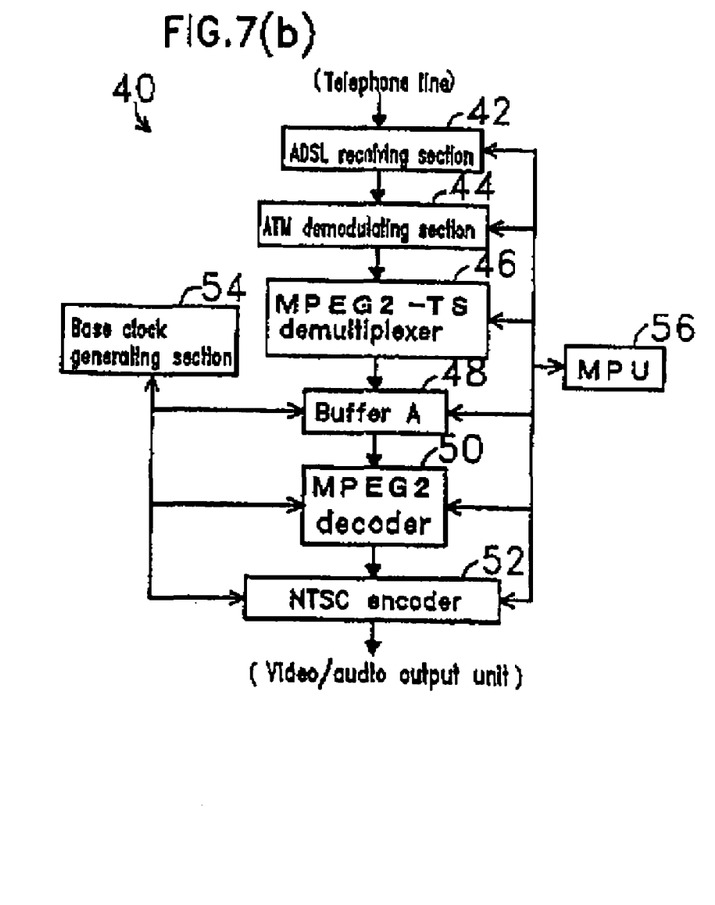
FIG. 7(b) is a block diagram showing a structure example of a conventional receiving and playing back apparatus.

FIG. 7(a) shows a transmitting server system 30 which is an example of configuration of the transmission side 10. FIG. 7(b) shows a receiving and playing back apparatus 40 which is an example of configuration of the reception side 20. In FIGS. 7(a) and 7(b), an ADSL is respectively used as an example of transmission line. The ADSL includes a telephone line. An ATM network 28 shown in FIG. 7(a) is a network inside the transmitting server system 30.

Figure 6B:
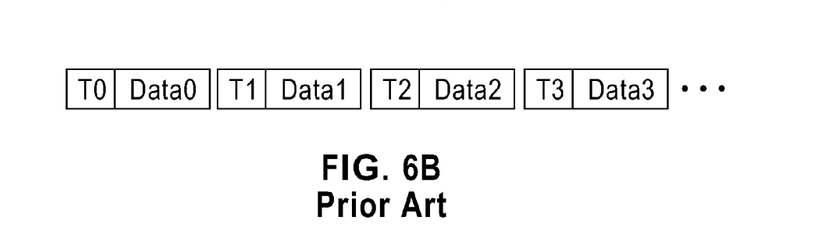
FIG. 6(b) shows an outline of time information attached to each divided MPEG2 data.

The transmitting server system 30 converts a plurality of moving pictures to MPEG2 data and transmits the data. MPEG2 encoders 32 compress moving picture data to MPEG2 data. The compressed MPEG2 data are merged into one data (MPEG2-TS (Transport Stream)) by an MPEG2 multiplexing section 34. Each MPEG2 data included in MPEG2-TS is, as shown in FIG. 6(b), divided into a plurality of data (DATA0, DATA1, DATA2, DATA3, ... ). Time information (T0, T1, T2, T3, ... ) taking account of time variations that have occurred during MPEG2 encoding is attached to each data (DATA0, DATA1, DATA2, DATA3, ... ) at the time of multiplexing. The time information shows relative playback time of moving picture data, so that the receiving and playing back apparatus 40 is capable of playing back or reproducing the moving picture data at correct playback time on the basis of the time information.

The MPEG2-TS packets are converted to ATM packets by an ATM converting section 36 and transmitted to an ADSL transmitting section 38 via the ATM network 28. The ADSL transmitting section 38 transmits data to the receiving and playing back apparatus 40 over a telephone line. Since the bandwidth of a telephone line is generally narrower than that of the ATM network 28 and the quality of the line is poor, variations in data transmission rate may be considered to be mostly caused by the telephone line.

In the receiving and playing back apparatus 40, an ADSL receiving section 42 receives data transmitted from the transmitting server system 30 and an ATM demodulating section 44 demodulates the ATM packets to MPEG2-TS packets. The demodulated MPEG2-TS includes a plurality of MPEG2 data, so that either one of the MPEG2 data is extracted by an MPEG2-TS demultiplexer 46. An MPU (Microprocessor Unit) 56 specifies the MPEG2 data to be extracted. The MPU 56 controls each section (42, 44, 46, 48, 50, 52, 54) of the apparatus 40. The extracted MPEG2 data is sent to an MPEG2 decoder 50 through buffer A (reference number 48). The moving picture data restored by the MPEG2 decoder 50 is converted to an NTSC (National Television System Committee) signal by an NTSC encoder 52 to be outputted to a video/audio output unit. The MPEG2 decoder 50 and the NTSC encoder 52 act as playback means. For example, speaker integrated-television monitors can be used as video/audio output units.

Time required for the above-mentioned data conversion processing to be performed within the transmitting server system 30 and the receiving and playing back apparatus 40 is not always constant. Variations in respective processing time for the MPEG2 data multiplexing, ATM packet conversion, and ADSL transmission may occur within the transmitting server system 30. Variations in respective processing time for the ADSL reception and the ATM demodulation may occur within the apparatus 40. Accordingly, variations in processing time for data conversion within the transmitting server system 30 and the apparatus 40 may cause variations in data transmission rate as well.

Figure 6C:
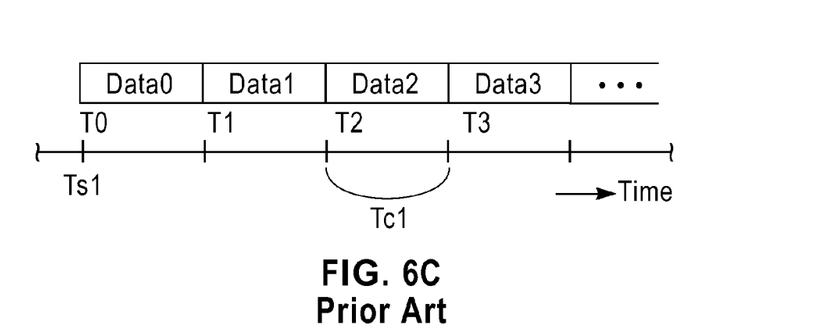
FIG. 6(c) shows time of moving picture playback on a transmission side.
Figure 6D:
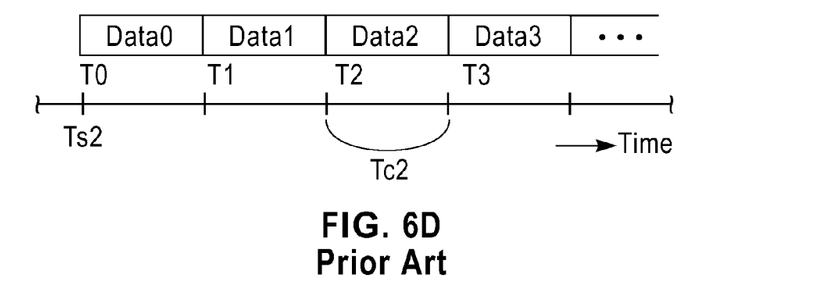
FIG. 6(d) shows time of moving picture playback on a reception side.

The variations in data conversion processing time can be compensated by coordinating the timing in the transmitting server system 30 and playing back apparatus 40 using the time information attached at the time of multiplexing. For example, data playback time specified by the server system 30 shown in FIG. 6(c) and data playback time on the apparatus 40 side shown in FIG. 6(d) can be matched by the time information (T0, T1, T2, T3, . . . ) attached to each of the divided MPEG2 data (DATA0, DATA1, DATA2, DATA3, . . . ) as shown in FIG. 6(b). Ts1 is playback starting time of the server system 30 side and Ts2 is playback starting time of the apparatus 40 side. Due to delay in transmission, it is indicated that Ts1<Ts2. Tc1 is time unit of the server system 30 side and Tc2 is time unit of the apparatus 40, and then Tc1=Tc2.

In the receiving and playing back apparatus 40 shown in FIG. 7(b), a base clock generating section 54 controls the time unit Tc2. The base clock generating section 54 generates a base clock for the entire apparatus 40. For example, 100 clocks of the base clock can be set to Tc2. Although it is generally set that Tc2=Tc1, the section 54 increases and decreases Tc2 depending on used space of buffer A.

When used space of buffer A exceeds a predetermined value and approaches an overflow, the base clock generating section 54 shortens the time unit Tc2 to speed up the playback time performed by the MPEG2 decoder 50 and the NTSC encoder 52. The moving picture data transmitted from buffer A to the MPEG2 decoder 50 temporarily increases because of a rise in playback speed. An increase in data volume outputted from buffer A prevents an overflow from occurring.

When the used space of buffer A decreases below a predetermined value and comes near to the state of no memory data (underflow), the base clock generating section 54 lengthens Tc2 to slow down the playback speeds of the MPEG2 decoder 50 and the NTSC encoder 52. The moving picture data transmitted from buffer A to the MPEG2 decoder 50 temporarily decreases because of a drop in playback speed. A reduction in data volume outputted from buffer A prevents an underflow from occurring.

If Tc2 can be adjusted in a wider range of time, wider variations in data transmission rate and data conversion time will be compensated. The base clock defining Tc2 is, however, used for the entire receiving and playing back apparatus 40, so that it is impossible to change Tc2 so widely. Thus, there is a limit on adjustment range of a receiving and playing back apparatus against variations in data transmission speed. Conventional receiving and playing back apparatuses have adaptability to variations of −0.1% to +0.1%. On the other hand, variations of some % to some tens % or greater may occur on conventional communication lines, such as telephone lines.

SUMMARY OF THE INVENTION

It is therefore an aspect of the present invention to reduce effects on playback of moving picture data caused by variations in data transmission rate that occur on a communication line.

An embodiment of an apparatus for receiving and playing back data according to the present invention includes means for receiving moving picture data transmitted over a communication line; means for playing back the received moving picture data; a first buffer memory for temporarily storing the moving picture data transmitted from the receiving means to the playback means and providing the playback means with the moving picture data required for playback processing; a second buffer memory for temporarily storing the moving picture data received by the receiving means; and means for controlling the speed of reading the moving picture data from the second buffer memory to transmit the moving picture data to the first buffer memory. The moving picture data can be inputted to the first buffer memory at a desired speed by disposing the second buffer memory.

An embodiment of a method for receiving and playing back data according to the present invention includes the steps of storing the received moving picture data in the second buffer memory; reading the moving picture data from the second buffer memory at a desired speed; storing the moving picture data read from the second buffer memory in the first buffer memory; reading the moving picture data required for playing back from the first buffer memory; and playing back the moving picture data read from the first buffer memory.

BRIEF DESCRIPTION OF THE SEVERAL VIEWS OF THE DRAWINGS

These and other aspects, features, and advantages of the present invention will become apparent upon further consideration of the following detailed description of the invention when read in conjunction with the drawing figures, in which.

REFERENCE CHARACTERS OF THE DRAWINGS

10: Transmission side
12, 32: MPEG2 (Moving Picture Expert Group-2) encoder
14 Transmitter
18: Communication line
20: Reception side
22: Receiver
24, 50: MPEG2 (Moving Picture Expert Group-2) decoder
28: ATM (Asynchronous Transfer Mode) network
30: Transmitting server system
34: MPEG2 (Moving Picture Expert Group-2) multiplexing section 36: ATM (Asynchronous Transfer Mode) converting section
38: ADSL (Asymmetric Digital Subscriber Line) transmitting section
40: Conventional receiving and playing back apparatus
42: ADSL (Asymmetric Digital Subscriber Line) receiving section
44: ATM (Asynchronous Transfer Mode) demodulating section
46: MPEG2-TS (Moving Picture Expert Group-2 Transport Stream) de-multiplexer
48: Buffer A (First buffer memory)
52: NTSC (National Television System Committee) encoder
54: Base clock generating section
56: MPU (Microprocessor)
60: Receiving and playing back apparatus
62: Buffer B
64: Memory capacity monitor
66: Reading mode switching unit
68: Reading controller
70: Buffer memory (Second buffer memory)

DETAILED DESCRIPTION

The present invention provides methods and apparatus to reduce effects on playback of moving picture data caused by variations in data transmission rate that occur on a communication line. An example apparatus for receiving and playing back data according to the present invention includes means for receiving moving picture data transmitted over a communication line; means for playing back the received moving picture data; a first buffer memory for temporarily storing the moving picture data transmitted from the receiving means to the playback means and providing the playback means with the moving picture data required for playback processing; a second buffer memory for temporarily storing the moving picture data received by the receiving means; and means for controlling the speed of reading the moving picture data from the second buffer memory to transmit the moving picture data to the first buffer memory. The moving picture data can be inputted to the first buffer memory at a desired speed by disposing the second buffer memory.

Thus, an apparatus for receiving and playing back data according to the present invention includes: a receiver to receive picture data transmitted over a communication line; a playback module to play back the received picture data; a first buffer memory for temporarily storing the picture data transmitted from the receiver the playback module and providing the playback module with the picture data required for playback processing; a second buffer memory for temporarily storing the picture data received by the receiver; and a controller to control the speed of reading the picture data from the second buffer memory to transmit the data to the first buffer memory. Each element of the apparatus is implemented as known to those skilled in the art.

In some embodiments, the invention is implemented as a computer program product comprising a computer usable medium having computer readable program code means embodied therein for causing receiving and playing back data, the computer readable program code means in said computer program product comprising computer readable program code means for causing a computer to effect the functions of the apparatus of the invention.

An example method for receiving and playing back data according to the present invention includes the steps of storing the received moving picture data in the second buffer memory; reading the moving picture data from the second buffer memory at a desired speed; storing the moving picture data read from the second buffer memory in the first buffer memory; reading the moving picture data required for playing back from the first buffer memory; and playing back the moving picture data read from the first buffer memory.

Next, an advantageous embodiment of a method and an apparatus for receiving and playing back data according to the present invention will be described in detail with reference to the accompanying drawings. A moving picture transmitting server system may be the same as a conventional transmitting server system 30 shown in FIG. 7(a).

Figure 1:
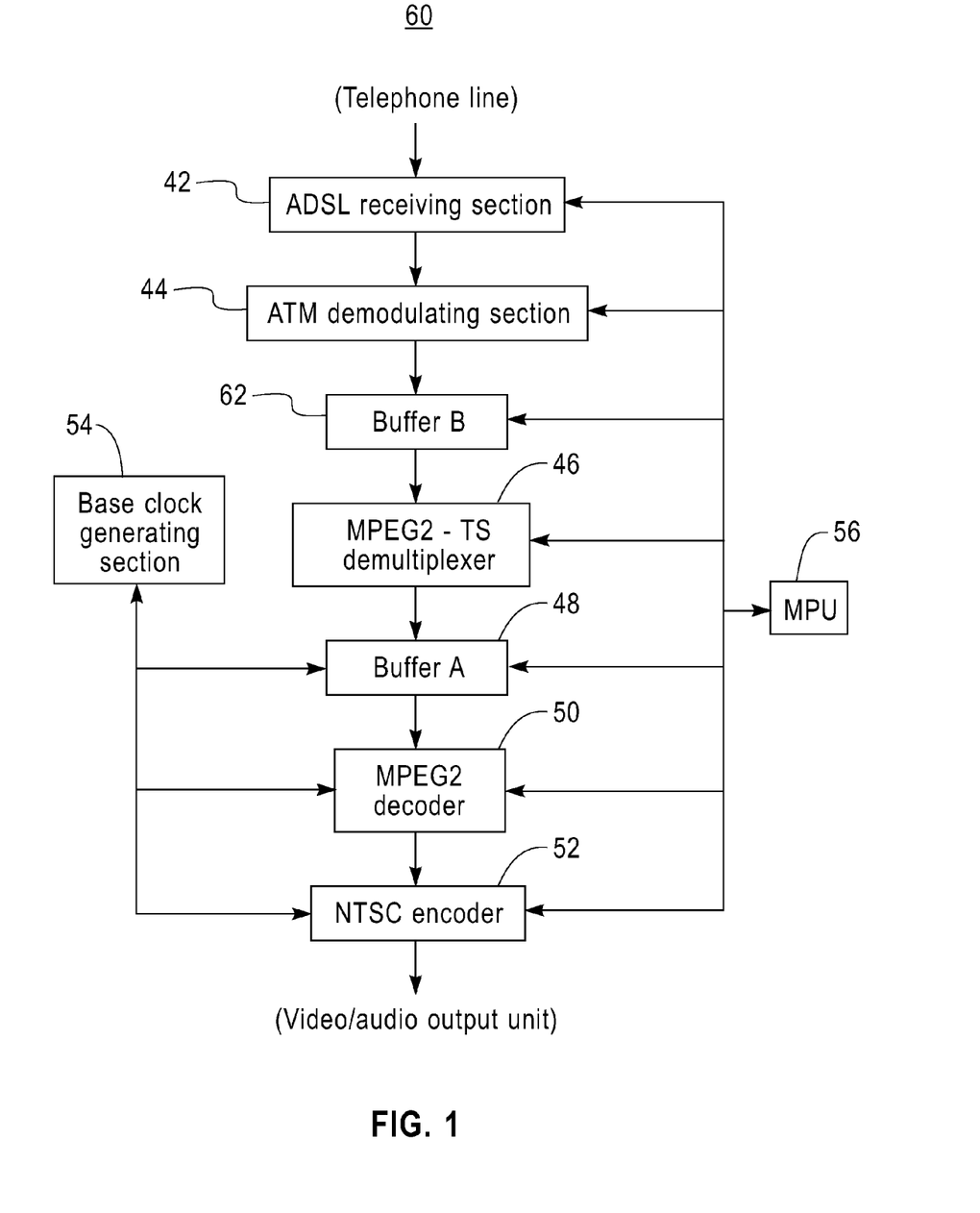
FIG. 1 is a block diagram showing a structure example of a receiving and playing back apparatus of the present invention.

FIG. 1 shows a configuration example of a receiving and playing back (or reproducing) apparatus 60 according to the present invention. The apparatus 60 includes buffer B (reference number 62) for temporarily storing moving picture data received by an ADSL receiving section 42 and outputting the stored moving picture data to buffer A (reference number 48) at a desired speed. The ADSL receiving section 42, ATM demodulating section 44, MPEG2-TS demultiplexer 46, buffer A, MPEG2 decoder 50, and NTSC encoder 52, base clock generating section 54, and MPU 56 except buffer B may be similarly configured to conventional ones (FIG. 7(b)).

MPEG2-TS is inputted to buffer B. The ADSL receiving section 42 receives data transmitted from a transmitting server system 30 over a telephone line. And the ATM demodulating section 44 demodulates the received data to obtain MPEG2-TS. MPEG2-TS is outputted from buffer B at a desired speed. The outputted MPEG2-TS is inputted to the MPEG2-TS de-multiplexer 46.

Since MPEG2-TS includes a plurality of MPEG2 data, the required MPEG2 data is extracted by the MPEG2-TS de-multiplexer 46. The extracted MPEG2 data is inputted to buffer A (reference number 48). Buffer A temporarily stores the MPEG2 data and provides moving picture data required for playback processing for the MPEG2 decoder 50. The decoder 50 restores the MPEG2 data outputted from buffer A to a state before compression. The NTSC encoder 52 converts the MPEG2 data to an NTSC signal. The moving pictures recovered by the decoder 50 and the encoder 52 are outputted to a video/audio output unit.

The base clock generating section 54 generates a base clock acting as operational criteria of respective sections of the receiving and playing back apparatus 60. In FIG. 1, a time unit Tc2, which is defined by the base clock, is transmitted to the MPEG2 decoder 50 and the NTSC encoder 52. In addition, the base clock generating section 54 monitors used space of buffer A. The MPU 56 controls respective sections (42, 44, 46, 48, 50, 52, 54, and 62) of the apparatus 60.

Figure 2:
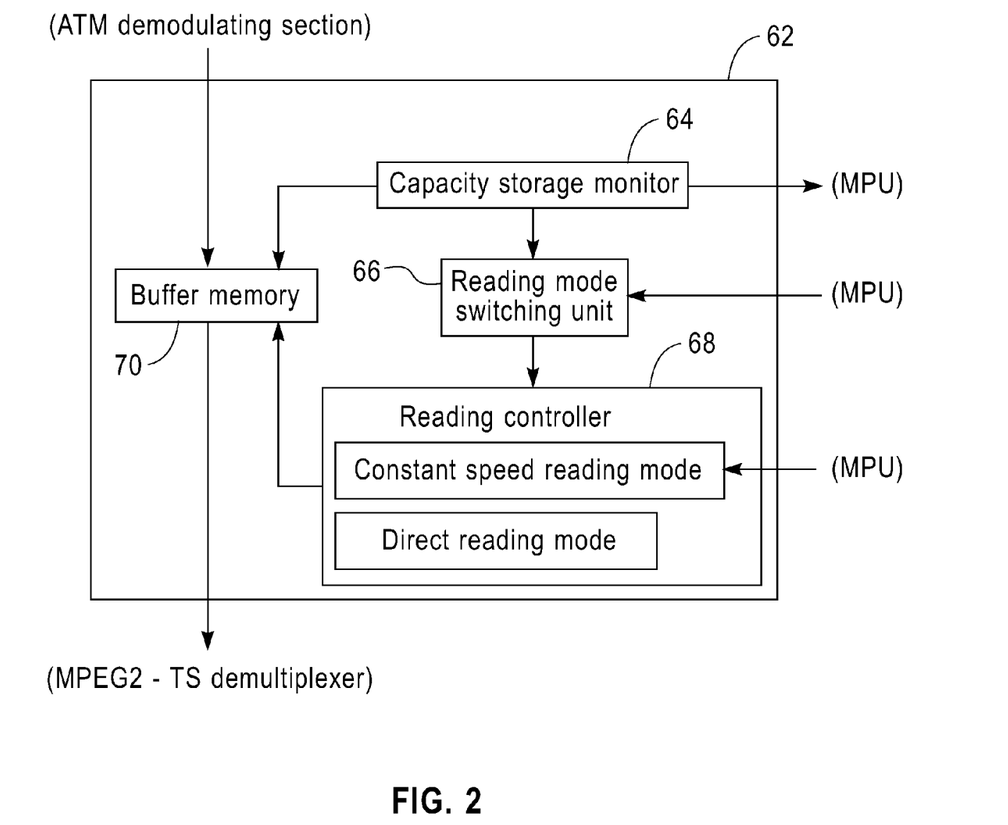
FIG. 2 is a block diagram showing a structure example of buffer B of the apparatus shown in FIG. 1.

Buffer B (reference number 62) includes, as shown in FIG. 2, a buffer memory 70 for temporarily storing MPEG-TS and buffer memory controlling means for controlling the speed of reading data from the buffer memory 70 (64, 68, 56). The buffer memory controlling means includes a memory capacity monitor 64 for monitoring the used space (i.e., data recorded area) of the memory 70 and a reading controller 68 for reading the moving picture data from the memory 70 at a speed specified by MPU 56. MPU 56 acts as part of the buffer memory controlling means as well. MPU 56 specifies the speed of reading the moving picture data from the memory 70 in response to a signal indicative of the used space of the memory 70 transmitted from the memory capacity monitor 64.

The reading controller 68 can operate in either one of constant speed reading mode for reading data at a constant speed and a direct reading mode for reading data at an arbitrary reading speed at which reading can be performed. In the direct reading mode, a transfer circuit (not shown) used for the constant speed reading is bypassed and the buffer memory 70 is read at a speed higher than or lower than the constant speed in response to an instruction from MPU 56. A reading mode switching unit 66 performs this mode switching. Either one of the memory capacity monitor 64 and MPU 56 gives the reading mode switching unit 66 an instruction to switch the mode.

Based on the used space of the buffer memory 70, MPU 56 specifies the speed of playback processing performed by the MPEG2 decoder 50 and the NTSC encoder 52 so as to change the speed of playing back the moving pictures.

Next, a description will be given to the operation of a receiving and playing back apparatus 60 and a method thereof. An ADSL receiving section 42 receives data transmitted from a transmitting server system 30 over a telephone line and an ATM demodulating section 44 demodulates the data to MPEG2-TS. MPEG2-TS is transmitted to buffer B to be temporarily stored. In normal state, the temporarily stored MPEG2-TS is read at a constant speed specified by the MPU 56. MPEG2-TS is inputted to the MPEG2-TS de-multiplexer 46 at the constant speed. The MPEG2-TS de-multiplexer 46 extracts MPEG2 data corresponding to a selected program specified by the MPU 56 out of the multiplexed MPEG2 data. The extracted MPEG2 data is stored in buffer A. The moving picture data required for playing back is read from buffer A to be transmitted to the MPEG2 decoder 50. The MPEG2 decoder 50 restores the MPEG2 data to a state before compression. The NTSC encoder 52 converts the restored moving picture data to an NTSC signal to be outputted to a video/audio output unit.

MPEG2-TS is outputted from buffer B at the constant speed, so that the MPEG2 data is inputted to buffer A at a substantially constant speed. The speed of outputting MPEG2-TS from buffer B is preferably equal to the transmission rate of MPEG2-TS transmitted from the transmitting server system 30. For example, MPU 56 determines an average data receiving speed of the MPEG2-TS received by the ADSL receiving section 42 and the average speed can be assumed to be an MPEG2-TS transmission rate transmitted from the server system 30. In the constant speed reading mode, MPU 56 may specify the average data receiving speed as the constant speed.

The uniform data output speed of buffer B enables to keep the data input speed to buffer A substantially uniform. It is possible to substantially equate the data input speed to buffer A with the data transmission rate from the transmitting server system 30 by matching the data output speed from buffer B with the data transmission rate from the server system 30. Buffer B can compensate variations in data transmission rate that occur on the communication line. Buffer A can compensate minor variations in playback time that occur within the server system 30 and the apparatus 60.

Although the reading speed of MPEG2-TS read from buffer B is preferably kept uniform, the reading speed may be temporarily changed to other desired speed by buffer memory controlling means (64, 68, 56). For example, there is a possibility of buffer B to cause overflow or underflow depending on the situation of variations in data transmission rate over a communication line.

Figure 3:
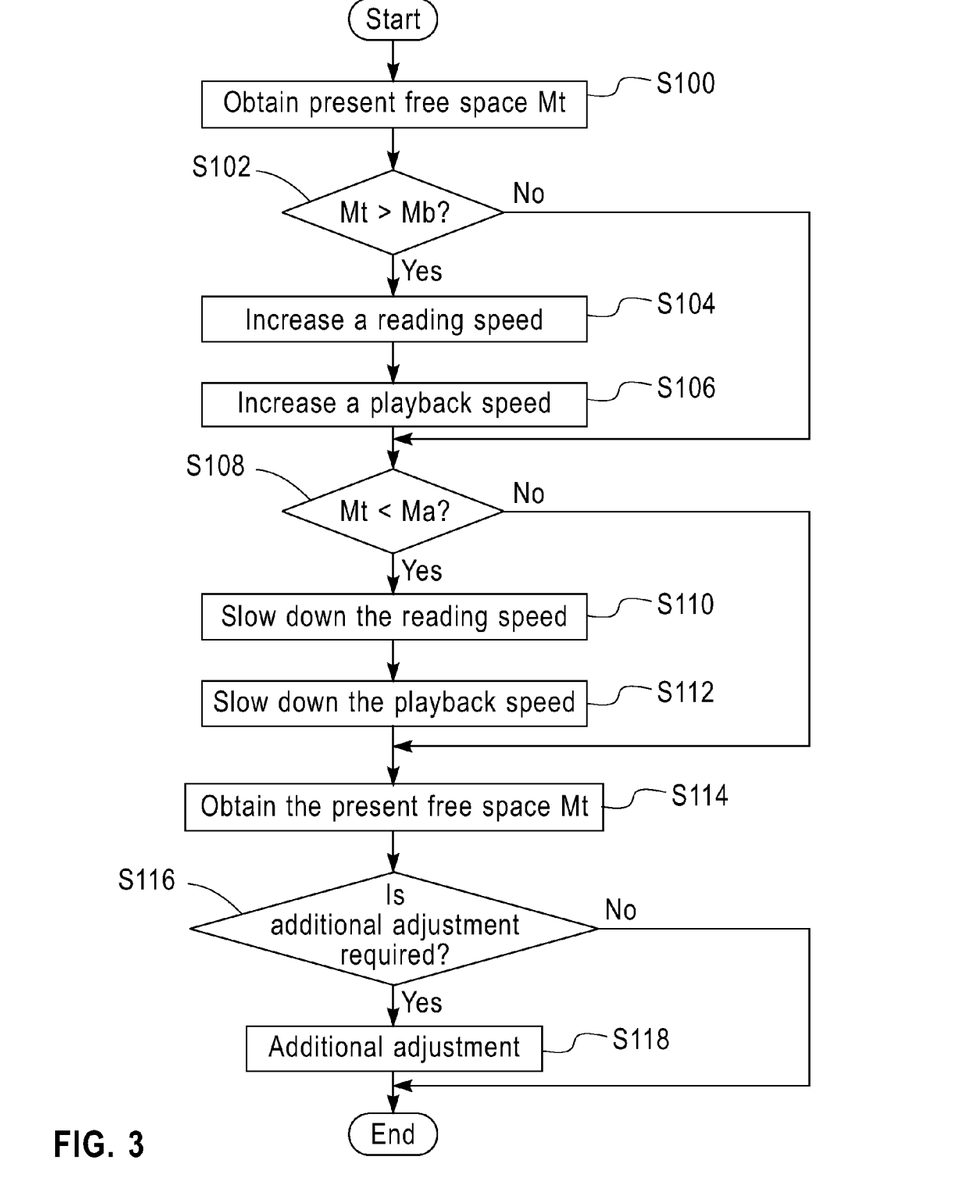
FIG. 3 is a flow chart showing an example of a procedure for adjusting the speed of reading data from buffer B.

FIG. 3 shows a data reading speed controlling procedure on the basis of the used space of buffer B. The memory capacity monitor 64 periodically monitors the used space of the buffer memory 70 and informs MPU 56 of the current used space Mt at predetermined time intervals (S100). MPU 56 specifies the speed of reading moving picture data from the memory 70 on the basis of the current used space Mt. Further, MPU 56 specifies the speed of playing back the moving picture data based on the current used space Mt of the memory 70.

When the current used space Mt is more than, for example, 80% of total memory capacity Mb and approaches an overflow (S102), MPU 56 gives the reading controller 68 an instruction to increase the speed of reading MPEG2-TS from the buffer memory 70 (S104). Further, MPU 56 gives an instruction to increase the playback speed of the MPEG2 data (S106). The playback speed of the MPEG2 data can be increased by shortening the time unit Tc2 based on the base clock generated by the base clock generating section 54.

When the current used space Mt is less than, for example, 20% of the total memory capacity Ma and approaches an underflow (S108), MPU 56 gives the reading controller 68 an instruction to slow down the speed of reading MPEG2-TS from the buffer memory 70 (S110). Further, MPU 56 gives an instruction to slow down the playback speed of the MPEG2 data (S112). The playback speed of the MPEG2 data can be reduced by lengthening the time unit Tc2 based on the base clock generated by the base clock generating section 54.

The reading controller 68 reads MPEG2-TS from the buffer memory 70 at the speed specified by MPU 56. The MPEG2 decoder 50 and the NTSC encoder 52 play back the MPEG2 data at the playback speed specified by MPU 56. The playback speed of the MPEG2 decoder and the NTSC encoder 52 is within a range of speed at which a viewer does not recognize variations in playback speed and display screen noise due to variations in the base clock does not occur. The speed of reading the MPEG2-TS from buffer B is also within a range of speed at which buffer A does not cause overflow or underflow.

It should be noted, however, that the occurrence of an overflow or an underflow may be unpreventable merely by the change of the above-mentioned reading speed. For example, there is a higher possibility that an overflow or an underflow occurs when the used space Mt of the memory (S114) continues to increase, even if the speed of reading data from buffer B is increased, and when the used space Mt of the memory (S114) continues to decrease, even if the speed of reading data from buffer B is reduced. If such a state requiring additional adjustment is detected (S116), additional adjustment processing (S118) is performed.

Figure 4:
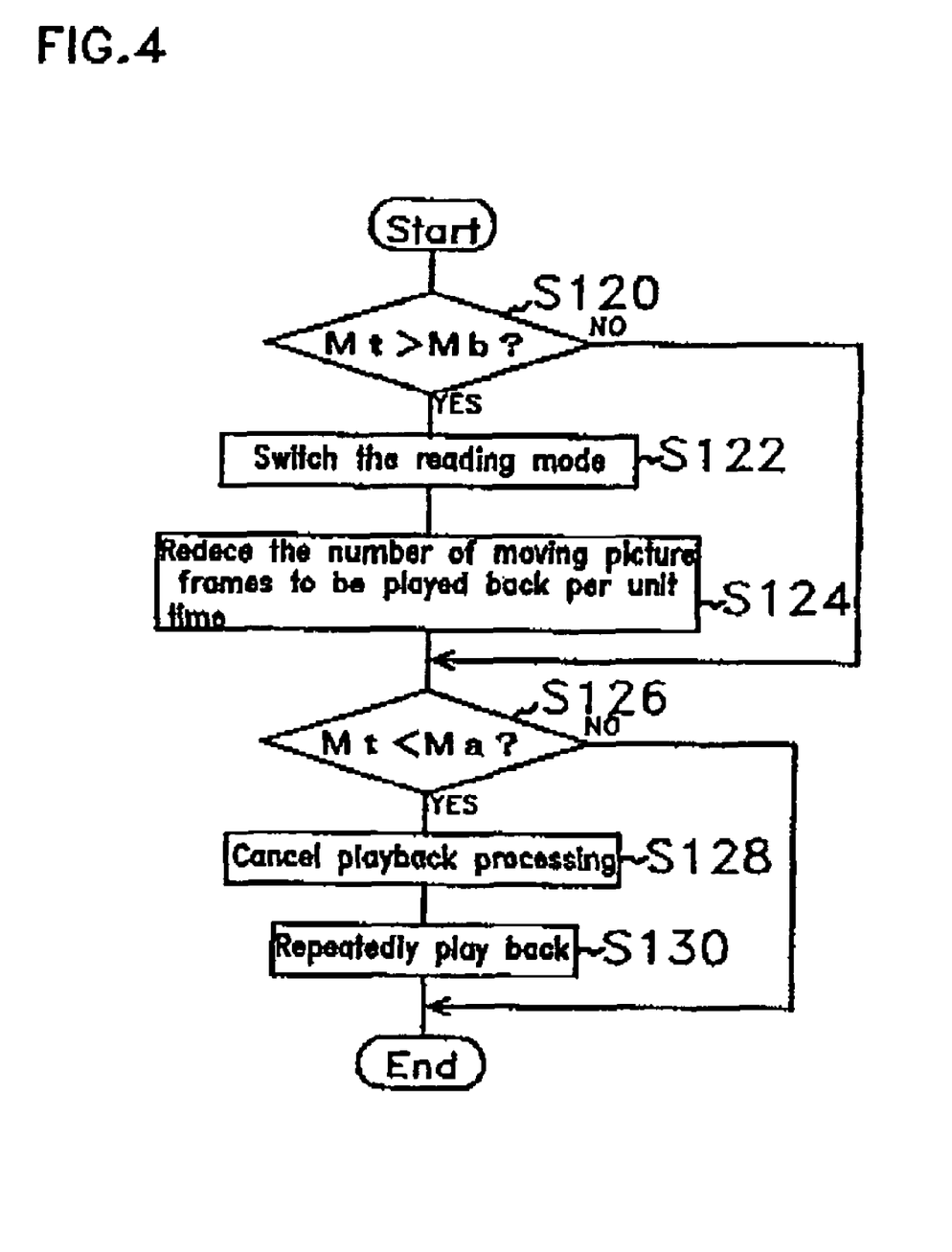
FIG. 4 is a flow chart showing an example of additional adjustment shown in FIG. 3.

FIG. 4 shows an example of the additional adjustment processing (S118). When the current used space Mt of the buffer is found to exceed, for example, 80% of the memory capacity Mb and approaches an overflow (S120), MPU 56 gives the reading mode switching unit 66 an instruction to switch to the direct reading mode. The reading mode switching unit 66 is responsive to the instruction to switch the reading mode of the reading controller 68 (S122). In addition, MPU 56 gives the MPEG2 decoder 50 an instruction to play back moving pictures with the number of moving picture frames to be played back per unit time reduced (S124) to further increase the speed of playing back the moving pictures.

When the current used space Mt of the buffer is smaller than, for example, 20% of the total memory capacity Ma and approaches an underflow (S126), MPU 56 gives the MPEG2 decoder 50 an instruction to suspend playback processing of a new moving picture frame (S128), and to repeatedly play back the moving picture frame which is being presently played back (S130).

It is possible to prevent the overflow or the underflow of buffer B from occurring by monitoring the used space of the buffer memory 70 and adjusting the speed of reading data from the memory 70 and the playback speed of the MPEG2 decoder 50 on the basis of the used space of the memory 70.

Although it is not shown in figures, when the used space Mt of the buffer memory 70 returns to normal (20 to 80% of the total memory capacity), control is necessary to return the reading speed and the moving picture playback speed to the original state. After the current used space Mt of the buffer returns to normal, MPU 56 gives the reading controller 68 an instruction to restore the playback speeds of the MPEG2 decoder 50 and the NTSC encoder 52, as well as giving an instruction to read data at the original constant speed. Such return control is performed in the steps of S116 and S118.

Instructions needed for MPU 56 to perform processing shown in FIGS. 3 and 4, and parameters, such as Ma and Mb are stored in memory means (not shown), such as ROM (Read Only Memory) and PROM (Programmable ROM) within the receiving and playing back apparatus 60. Ma and Mb can be set to arbitrary values.

Figure 5A:
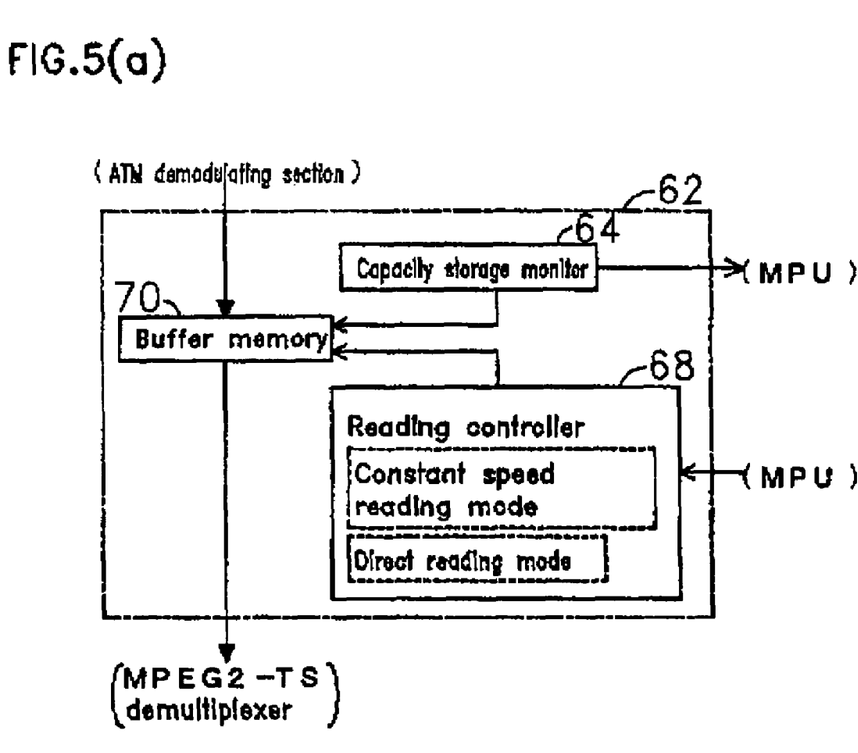
FIGS. 5(a) and 5(b) are each block diagrams respectively showing another structure example of buffer B of the receiving and playing back apparatus.
Figure 5B:
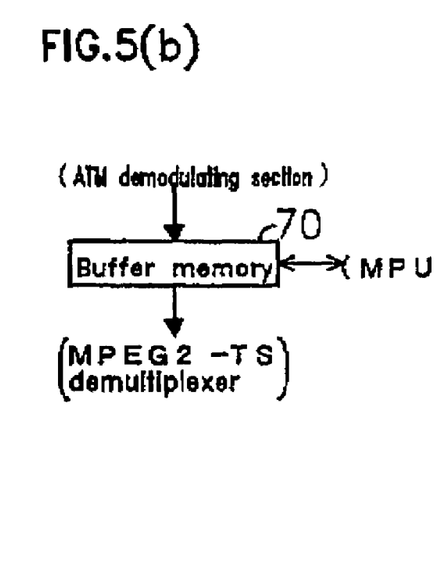

As mentioned above, one embodiment according to the present invention has been described so far, but the present invention is not limited to this embodiment. For example, as shown in FIG. 5(a), MPU may directly give the reading controller 68 an instruction to switch the reading mode of buffer B. Further, as shown in FIG. 5(b), MPU can monitor the used space of buffer B.

Buffer B may be placed at any position between the ADSL receiving section 42 and buffer A. Buffer B is preferably provided at a position close to buffer A to prevent time variations in various processing of data from buffer B from giving influence on playback processing of moving pictures.

The MPEG2-TS de-multiplexer 46 shown in FIG. 1 may be omitted, when the moving picture data to be transmitted is not multiplexed. Any receivers and demodulators conforming to the protocol of the moving picture data to be transmitted can be used for the ADSL receiving section 42 and the ATM demodulating section 44.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Thus, although there have thus been shown and described methods and apparatus for receiving and playing back data which fulfill all the objects and advantages sought therefor. Many changes, modifications, variations and other uses and applications of the subject invention will however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

We claim:

1. An apparatus comprising:
    a receiving section for receiving recorded moving picture data transmitted from a transmitting server over a communication line, said moving picture data having a predetermined playback rate;
    a demodulating section that demodulates the moving picture data and provides demodulated moving picture data;
    a second buffer memory for temporarily storing the demodulated moving picture data received by the receiving section, wherein said demodulated moving picture data is read from said second buffer memory at a desired speed;
    a de-multiplexer that receives the demodulated moving picture data at a constant speed and extracts the demodulated moving picture data required for playback processing from the second buffer memory and provides extracted moving picture data;
    a first buffer memory for storing the extracted moving picture data, wherein said extracted moving picture data is read from said first buffer memory for playback;
    a decoder configured for receiving the extracted moving picture data from the first buffer memory and for restoring said extracted moving picture data to a state before compression;
    an encoder configured for converting the restored extracted moving picture data to an output signal;
    a base clock used to define a local time limits unit;

wherein said local time unit is adjusted to prevent underflows and overflows in both buffers; and
wherein said local time unit can be adjusted to differ from a time unit used by the transmitting server; and
a micro-processing unit for specifying a speed of playing back the moving picture data based on used space of the second buffer memory, for changing a playback speed of the moving picture data.

2. The apparatus of claim 1 wherein the encoder is implemented as a national television system committee encoder for converting the extracted moving picture data to the output signal using a standard according to the national television system committee.

3. The apparatus of claim 1 wherein the base clock transmits the local time unit to the decoder and the encoder.

4. The apparatus of claim 1 wherein the second buffer memory comprises:
a buffer memory for temporarily storing the moving picture data; and
a buffer memory controller for controlling a speed of reading data from the buffer memory.

5. The apparatus of claim 4 wherein the buffer memory controller comprises:
a memory capacity monitor for monitoring the used space for the moving picture data recorded in the buffer memory; and
a reading controller for reading the moving picture data from the buffer memory at a speed specified by the micro-processing unit.

6. The apparatus of claim 5 wherein the reading controller operates in one mode from a group consisting of: a constant speed reading mode for reading data at a constant speed, and a direct reading mode for reading data at an arbitrary reading speed at which reading can be performed,
wherein, when in the direct reading mode, a transfer circuit used for the constant speed reading is bypassed and the buffer memory is read at one of a speed higher than or lower than the constant speed in response to an instruction from the micro-processor unit.

7. The apparatus of claim 6 wherein the reading controller comprises a reading mode switching unit to switch between the direct reading mode and the constant speed reading mode, wherein one of the memory capacity monitor and the microprocessor unit gives the reading mode switching unit an instruction to switch the reading mode.

8. The apparatus of claim 5 wherein the memory capacity monitor transmits to the micro-processing unit a signal indicative of the used space of the second buffer memory.

9. The apparatus of claim 1 wherein the demodulated moving picture data is MPEG-TS data.

10. The apparatus of claim 9 wherein the extracted moving picture data and the decoder are implemented using the MPEG-2 standard.

11. The apparatus of claim 1 wherein the receiving section uses an asymmetric digital subscriber line.

12. The apparatus of claim 1 wherein the base clock further monitors the used space of the first buffer memory.

13. The apparatus of claim 12 wherein the base clock prevents an overflow when the used space of the first buffer memory increases above a predetermined value by shortening the local time unit to speed up playback time performed by the decoder and the encoder, such that the extracted moving picture data transmitted from the first buffer memory to the decoder temporarily increases because of an increased playback speed.

14. The apparatus of claim 12 wherein the base clock prevents an underflow when the used space of the first buffer memory decreases below a predetermined value and comes near to a state of no memory by lengthening the local time unit to slow down the playback speed of the decoder and the encoder.

15. A non-transitory computer readable storage medium comprising instructions for causing a processor to perform a method for receiving and playing back recorded moving picture data comprising steps of:
receiving recorded moving picture data transmitted from a transmitting server over a communication line, said moving picture data having a predetermined playback rate;
demodulating the moving picture data to provide demodulated moving picture data;
storing the demodulated moving picture data in a second buffer memory;
extracting the demodulated moving picture data required for playback processing from the second buffer memory for generating extracted moving picture data;
restoring said extracted moving picture data to a state before compression;
converting the restored moving picture data to an output signal;
setting a base clock to define a local time unit;
wherein said local time unit is adjusted to prevent underflows and overflows in both buffers; and
wherein said local time unit can be adjusted to differ from a time unit used by the transmitting server;
using the local time unit to specify a speed of playing back the moving picture data based on used space of the second buffer memory; and
playing back at the specified playback rate the moving picture data read from the first buffer memory and independently reducing the effects of playback due to variations in data transmission rates.

16. The computer readable storage medium of claim 15 wherein the receiving step comprises uses an asymmetric digital subscriber line for receiving the recorded moving picture data.

17. The computer readable storage medium of claim 15 further comprising a step of monitoring used space of the first buffer memory.

18. The computer readable storage medium of claim 17 further comprising a step of preventing an overflow when the used space of the first buffer memory increases above a predetermined value by shortening the local time unit to speed up playback time, such that the extracted moving picture data transmitted from the first buffer memory temporarily increases because of an increased playback speed.

19. The computer readable storage medium of claim 17 further comprising a step of preventing an underflow when the used space of the first buffer memory decreases below a predetermined value and comes near to a state of no memory by lengthening the local time unit to slow down the playback speed.

20. The computer readable storage medium of claim 17 further comprising a step of:
transferring between a constant speed reading mode for reading data at a constant speed and a direct reading mode for reading data at an arbitrary reading speed;
wherein, when in the direct reading mode, a transfer circuit used for the constant speed reading mode is bypassed and the first buffer memory is read at one of a speed higher than or lower than the constant speed.

* * * * *